United States Patent [19]

Perrino

[11] E Re. 30,342

[45] Reissued Jul. 22, 1980

[54] WIRE STRIPPER HAVING REPLACEABLE BLADES

[75] Inventor: Joseph A. Perrino, Rehoboth, Mass.

[73] Assignee: Micro Electronics, Inc., Rehoboth, Mass.

[21] Appl. No.: 35,555

[22] Filed: May 3, 1979

Related U.S. Patent Documents

Reissue of:

[64] Patent No.: 4,108,028
Issued: Aug. 22, 1978
Appl. No.: 770,984
Filed: Feb. 22, 1977

[51] Int. Cl.[2] ..... H02G 1/12
[52] U.S. Cl. ..... 81/9.5 B
[58] Field of Search ..... 30/90.1; 81/9.5 R, 9.5 B, 81/423

[56] References Cited

U.S. PATENT DOCUMENTS

| | | | |
|---|---|---|---|
| 1,289,381 | 12/1918 | Brumfield | 81/9.5 R |
| 2,697,956 | 12/1954 | Cook | 81/9.5 R X |
| 3,827,317 | 8/1974 | Perrino | 81/9.5 B |

*Primary Examiner*—James G. Smith
*Attorney, Agent, or Firm*—Salter & Michaelson

[57] ABSTRACT

A device for stripping insulation from the end of electrical wiring comprising hand-held elongated grip members that are interconnected in pivotal relation at an end thereof, a tubular member extending between the grip member and guiding the wire to be stripped therethrough toward opposed blade assemblies. The opposed blade assemblies are removably secured to the grip members for movement therewith to a closed position, the blade assemblies including opposed flat blade elements that cooperate to strip the insulation from the wire that is directed therebetween from the tubular element.

3 Claims, 7 Drawing Figures

WIRE STRIPPER HAVING REPLACEABLE BLADES

Matter enclosed in heavy brackets [ ] appears in the original patent but forms no part of this reissue specification; matter printed in italics indicates the additions made by reissue.

BACKGROUND OF THE INVENTION

The present invention relates to a wire stripper and has particular application as a portable hand-held device for use in stripping insulation from small diameter wire.

Wire stripping devices for use in the stripping of insulation from electrical wire are well known in the art, and over a period of time have taken various shapes and forms in the construction thereof. In the stripping of insulation from small diameter wire, many of the wire strippers known heretofore have not been altogether satisfactory because the cutting elements of these prior known devices quite frequently cut through the insulation and into the wire strands, thereby nicking the wire strands and reducing the conductivity characteristics thereof. In most of these prior known stripping devices, the depth of cut of the cutting elements was not precisely controlled; and as a result, the user of the device had to gauge how deeply to cut into the insulation. Approximating the depth of cut of the cutting elements was not always accurate and nicking or cutting of the wire strands oftentimes resulted in the use of many of the prior known devices.

In U.S. Pat. No. 3,827,317, a wire stripper is disclosed that represents an improvement over the conventional wire stripping device and does include a specific form of cutting element that is precisely controlled with respect to the depth of cut thereof so that nicking or cutting of the wire strands is prevented when insulation is stripped therefrom. Although the wire stripper disclosed in U.S. Pat. No. 3,827,317 performs in a satisfactory manner for the purpose disclosed and described in the patent, the present invention represents an improvement thereover, particularly in the blade assembly.

SUMMARY OF THE INVENTION

The present invention relates to a device for stripping insulation from an end portion of a wire, and is an improvement in the wire stripper illustrated and described in U.S. Pat. No. 3,827,317.

The present invention includes a pair of hand-held grip members that are pivotally interconnected at one end thereof, a tubular member extending through the interconnected ends of the grip members and defining a guide for receiving the lead-in portion of a wire from which insulation is to be stripped. Replaceable blade assemblies are secured to the grip members for movement therewith, each of the blade assemblies including a flat blade element having a notch formed in a cutting edge thereof, the notches as formed in the opposed blade elements cooperating to define an opening of predetermined size for receiving the wire from which the insulation is to be stripped. Thus, upon a pivotal movement of the grip members to the closed position thereof, the blade elements are movable therewith to engage the wire for penetrating the insulation thereof. Each of the blade assemblies including the blade element located therein is easily removed from its assembled position with a grip member for replacement of the blade element by a similar unit and as determined by the size of the wire to be stripped.

Accordingly it is an object of the present invention to provide a hand-held wire stripping device that includes replaceable blade elements for penetrating the insulation of a wire so that a measured portion of the insulation can be effectively stripped from the wire.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 3:
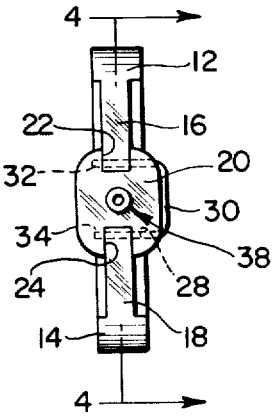
FIG. 3 is a front elevational view thereof.

Referring now to the drawing, the wire stripper embodied in the present invention is generally indicated at 10, and as illustrated is of the hand-held type that is designed to strip insulation from small diameter wire, and in this connection, various diameter wire may be stripped by the device. The wire stripper 10 includes substantially identically formed grip members 12 and 14 that are elongated in shape and configuration, and that include toe portions 16 and 18 respectively. Interconnecting the toe portions 16 and 18 is a pivot block 20 that is formed with opposed slots 22 and 24. As shown more clearly in FIG. 3, the toe portions 16 and 18 are somewhat reduced in lateral dimension with respect to the grip members 12 and 14 to which they are respectively connected, and are received in the slots 22 and 24 respectively of the pivot block 20. Formed in the pivot block 20 are holes 26 and 28 that are aligned with corresponding holes formed in the innermost ends of the toe portions 16 and 18. A U-shaped clip 30 is provided for securing the pivot block 20 to the grip members 12 and 14 and includes legs 32 and 34 that project through the holes 26 and 28 formed in the pivot block and through the aligned holes in the toe portions 16 and 18, thereby locking the grip members 12 and 14 to the pivot block 20.

Formed axially in the pivot block 20 is a bore 36 that is dimensioned for receiving therein a tubular member generally indicated at 38. As shown more clearly in FIG. 5, the tubular member 38 includes a body portion 40 in which an axial bore 42 extends for a substantial portion of the length thereof. Formed in the outermost end of the body portion 40 and communicating with the bore 42 is a tapered opening 44 that provides for easy entry of the lead in portion of a wire from which insulation is to be stripped. The innermost end of the tubular member 40 is formed with a reduced projection 46 through which a passage 48 extends and that communicates with the bore 42. The passage 48 also extends into the body portion 40 of the tubular member for communication with the bore 42 and is formed of a diameter that is slightly greater than the diameter of the insulated wire that is received therein and from which the insulation is to be stripped.

Figure 7:
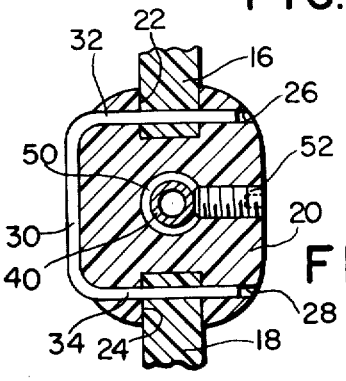
FIG. 7 is a sectional view taken along line 7—7 in FIG. 1.

In order to retain the tubular member 38 in a fixed position in the pivot block 20, an annular recess 50 is formed therein intermediate the ends thereof and receives an Allenhead screw 52 that threadably engages a hole in the pivot block 20, the screw 52 defining a set screw for securing the tubular member 38 in position, as more clearly illustrated in FIG. 7.

Figure 4:
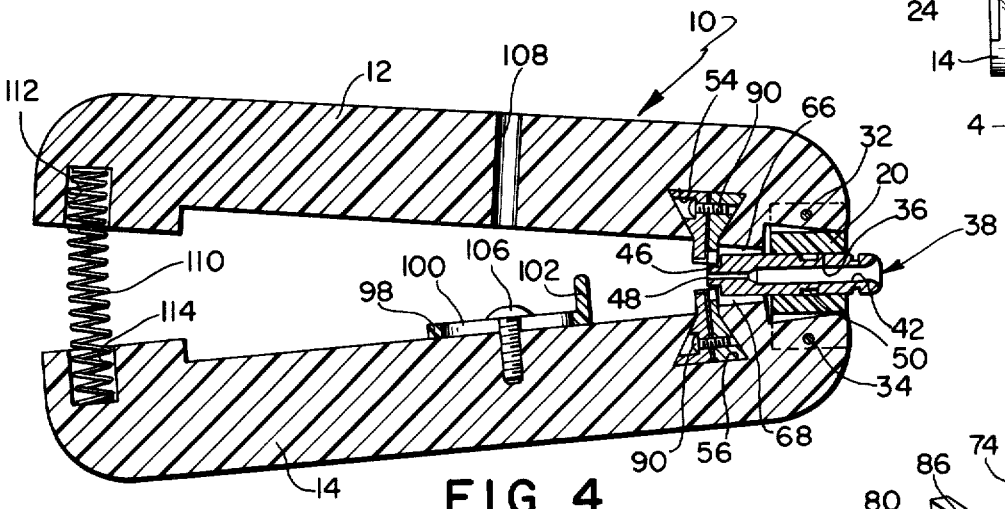
FIG. 4 is a sectional view taken along line 4—4 in FIG. 3.
Figure 5:
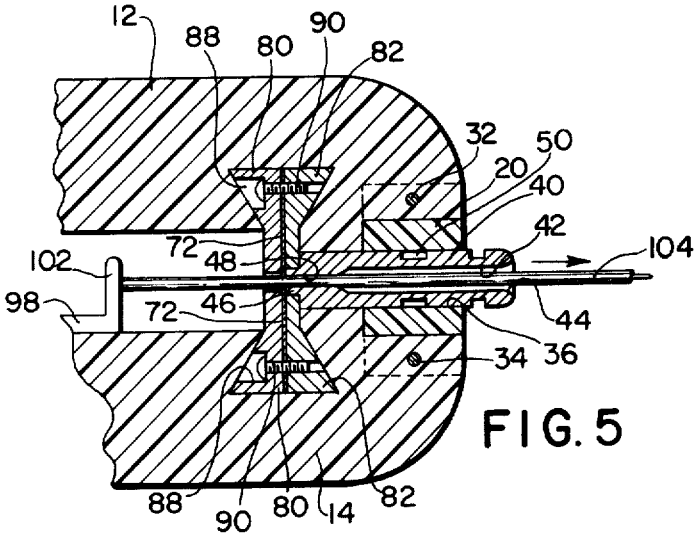
FIG. 5 is an enlarged fragmentary sectional view similar to FIG. 4 and showing the grip members in the closed position thereof.

Formed in the grip members 12 and 14 adjacent to the pivotal end thereof are wedge-shaped openings 54 and 56. As shown more clearly in FIG. 1, the grip members 12 and 14 are formed with extensions 58 and 60 that are located adjacent to the wedge-shaped openings 54, the extensions 58 and 60 being provided with rearwardly extending faces 62 and 64 respectively. As illustrated in FIG. 4, the extensions 58 and 60 are also formed with longitudinally extending grooves 66 and 68 respectively that accommodate the adjacent portion of the tubular member 38, when the grip members 12 and 14 are moved to the closed position thereof as illustrated in FIG. 5.

Figure 6:
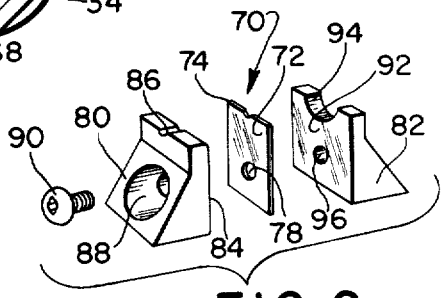
FIG. 6 is an exploded perspective view of one of the blade assemblies.

Frictionally mounted within the wedge-shaped openings 54 and 56 are blade assemblies 70, one of which is more clearly illustrated in FIG. 6. Each of the blade assemblies 70 in the assembled position thereof has a wedge-shaped configuration corresponding to that of the openings 54 and 56 and is frictionally received therein. As shown more clearly in FIG. 6, each of the blade assemblies 70 includes a flat blade element 72 the uppermost edge 74 of which defines the cutting edge thereof. Formed in the cutting edge 74 is a notch 76 that cooperates with the corresponding notch formed in the opposite blade element to define an opening of predetermined size for receiving the wire from which the insulation is to be stripped, as will hereinafter be described. Formed in the blade element 72 in the body thereof is a hole 78 that receives a fastening screw used in the assembly of the blade assembly. In order to secure the blade element 72 in place, the blade assembly 70 includes holder elements 80 and 82. As shown in FIG. 6, the holder element 80 is formed with a planar face 84 that receives the blade element 72 thereagainst. The body portion of the holder element 80 is formed with a configuration that when it is assembled with the body element 82 defines a wedge-shaped member that has a configuration corresponding to that of the openings 54 and 56. Formed in the uppermost end of the holder element 80 is a groove 86 that also cooperates with a similar groove formed in the corresponding blade assembly 70 to define an opening through which the wire extends from which insulation is to be stripped. A countersunk opening 88 extends through the body of the holder element 80 for accommodating a headed screw 90.

The holder-element 82 has a configuration similar to that of the holder element 80 and is also formed with a planar face 92 that engages the flat blade element 72. Located in the uppermost end of the holder element 82 is a groove 94, the radius of curvature of which is substantially larger than that of the groove 86 formed in the holder element 80 and that is dimensioned for receiving the reduced projection 46 of the tubular element 38 therein. It is seen that when the grip members 12 and 14 are moved to the closed position thereof as illustrated in FIG. 5, the grooves 94 as formed in the holder elements 82 of the blade assemblies define a recess that receives the projection 46 in tight-fitting relation. The recess as defined by the grooves 94 acts to align the tubular member 38 relative to the blade assemblies 70, so that the wire from which insulation is to be stripped can be threaded through the bore 48 of the tubular member 38 and outwardly of the tubular member 38, as will hereinafter be described. Also formed in the body of the holder element 82 is a threaded opening 96 that engages the threaded shank of the headed screw 90, the screw 90 securing the blade element 72 between the holder elements 80 and 82 in the assembled position thereof. As shown in FIGS. 4 and 5, the assembled blade assemblies 70 have a configuration corresponding to that of the wedge-shaped openings 54 and 56 and are frictionally retained in position therein. In the assembled position, the rearwardly extending faces 62 and 64 of the extensions 58 and 60 engage the exposed adjacent portions of the holder elements 80 and 82 and further aid in properly locating the blade assemblies 70 in position. If necessary, and when it is desired to replace the blade assemblies 70, either of them is removed from its assembled position in the openings 54 or 56 in the grip members 12 and 14 by merely pushing it outwardly of its opening.

In order to remove a specific amount of insulation from a wire, a gauge 98 is provided and includes an elongated body having a slot 100 formed therein to which an upstanding end portion or stop 102 is joined. The stop 102 is spaced from the blade assemblies 70 and is located in alignment with the tubular member 38 for receiving the lead-in portion of a wire indicated at 104 for engagement therewith. A fastener 106 projects through the slot 100 and is threadably received in a threaded opening formed in the grip member 14. It is seen that the gauge 98 may be adjusted in position on the interior edge of the grip member 14 to locate the stop 102 at a required distance from the blade elements 72 so as to precisely determine the length of insulation to be stripped from the wire 104. Adjustment of the position of the stop 102 is accomplished by loosening the fastener 106 and moving the gauge 98 forwardly or rearwardly with respect to the blade assemblies 70. As further illustrated in FIG. 4, access to the fastener 78 is provided by a bore 108 that extends laterally through the grip member 12, the bore 108 being located in alignment with the fastener 106 and being of a sufficient dimension to accommodate the shank of a wrench, such as an Allenhead wrench therein.

Figure 1:
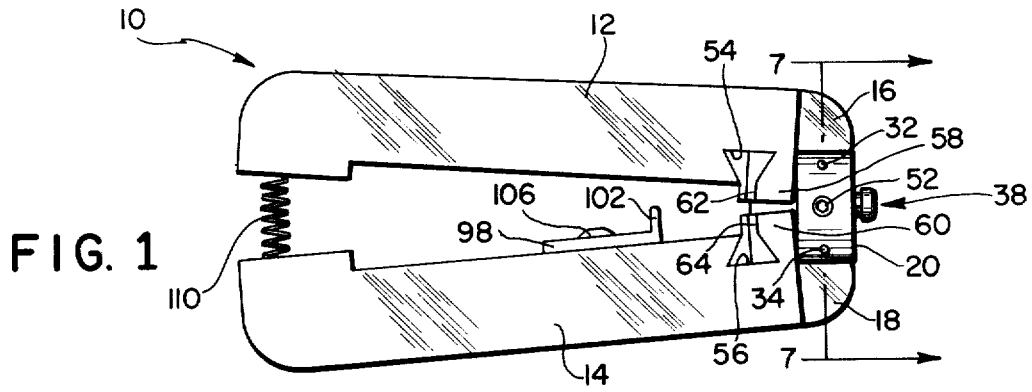
FIG. 1 is a side elevational view of the wire stripper as embodied in the present invention showing the grip members in the open position thereof.
Figure 2:
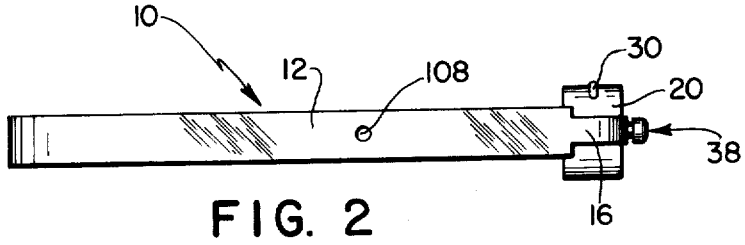
FIG. 2 is a top plan view thereof.

In order to urge the grip members 12,14 to the outer pivoted position as illustrated in FIGS. 1 and 4, a spring 110 is provided and extends into suitable openings 112 and 114 as formed in the heel ends of the grip members 12 and 14, respectively. It is seen that the spring 110 normally urges the grip members 12 and 14 to the outer pivoted position thereof but is compressed to provide for the inward pivotal movement of the grip members as required.

In the use of the device, the wire 104 is threaded through the tubular members 38, while the grip members 12 and 14 are located in the open position thereof as illustrated in FIG. 4. The tapered openings 44 of the tubular member 38 provides for easy entry of the lead-in end of the wire 104, the wire projecting through the enlarged bore 42 into the reduced passage 48 and then outwardly thereof for contact with the stop 102 of the gauge 98. The grip members 12 and 14 are then pivotally moved to a closed position, wherein the cutting assemblies 70 as carried by the grip members are moved therewith to the closed position as illustrated in FIG. 5. In this position, the blade elements 72 of the blade assembly 70 are moved into engagement with the insulation of the wire 104, the notches 76 as formed in the cutting edges of the blade elements 72 being of a predetermined curvature to form an opening that enables the cutting edges of the blade elements to penetrate the insulation to the wire therein. The dimension of the opening as defined by the notches 76 prevents the cutting edges of the blade elements from scoring the metal wire. With the grip members 12 and 14 located in the closed position, the outer end of the wire 104 is pulled outwardly, thereby stripping the insulation from the wire that is located between the blade elements 72 and the stop 102. Thereafter the grip elements 12 and 14 are released and the wire 104 is pulled outwardly of the tubular member 38 with the end of the wire stripped of the insulation as described.

It is seen that the movement of the blade assemblies 70 to the closed position captures the reduced projection 46 in the recess as defined by the grooves 94 of the holder elements 82, and aligns the bore 42 and passage 48 formed in the tubular member 38 with the opening as defined by the notches 76 of the blade elements 72. This assures that the wire 104 as threaded through the tubular member 38 is properly located with respect to the blade elements 72, and upon the movement of the blade elements 72 to the cutting position, only the insulation will be severed by the blade elements 72 for the purpose of the stripping thereof from the wire.

If it is desired to strip a wire of different diameter, the tubular member 38 and the blade assemblies 70 may be removed from the grip members and replaced with similar elements of the appropriate size. This is easily accomplished by releasing the set screw 52 for removal of the tubular member 38, and pushing the blade assemblies outwardly of the openings 54 and 56 as formed in the grip members. The newly selected blade assemblies are then inserted into the openings 54 and 56, and the appropriate tubular member is located in the pivot block 20 as previously described. The alignment of the tubular member is assured by closing the grip members to capture the reduced forward projection 46 of the tubular member in the recess as defined by the grooves 94 of the newly inserted blade assemblies.

It is further seen that the tubular member 38 and the reduced passage 48 as formed therein provides support for the wire 104 that is to be stripped at the end thereof. Thus a straight line withdrawal of the wire is assured and since the wire is held straight and cannot be deflected, nicking of the metal portion of the wire is prevented during the stripping operation.

It is also contemplated that each of the blade assemblies 70 be molded in a unitary construction. In this connection, the blade element 72 is permanently bonded between the faces 84 and 92 of the holder elements 80 and 82, thereby avoiding the use of the screw 90. A further alternate construction contemplated is the use of a modified gauge or stop for measuring the length of the wire to be stripped. The modified stop includes a member mounted on the inside edge of the grip member that has downwardly extending flanges that are inwardly turned for being received in longitudinally extending undercut portions or grooves. Detent markings would be used to set the stop in a selected position, and it is seen that the modified stop would avoid the use of the fastener 106 and the cutting of the bore 108 through the grip member 12.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for stripping insulation from relatively small diameter electrical wire, comprising a pair of hand-held elongated grip members, means for pivotally interconnecting said grip members at one end thereof, the other ends of said grip members being movable relative to each other to provide for the pivotal movement of said members to and from a closed stripping position thereof, an elongated tubular guide located in said interconnecting means intermediate the said grip members and receiving therein in guiding relation the lead-in portion of a wire from which insulation is to be stripped, a reduced projection formed on the innermost end of said tubular guide, each of said grip members having a laterally extending slot formed therein, opposed blade assemblies removably secured in the slots in said grip members for movement with said grip members to the closed position thereof, each of said blade assemblies including an inner and outer holder element having flat opposed faces, a flat blade element located between the flat opposed faces of the holder elements in sandwiched relation and having a cutting edge in which a notch is formed, wherein the opposed blades in the closed stripping position define an opening of predetermined size for receiving the wire from which insulation is to be stripped, each of said holder elements having a circular notch formed therein that is aligned with the notch in the adjacent blade element, [the diameter of the notch in said outer holder element being greater than the diameter of the notch in said inner holder element,] the notches in the outer holder element of both blade assemblies forming an opening when the grip members are moved to the closed stripping position, the size of which is just slightly larger than that of said reduced projection, so that the reduced projection is received in snug-fitting relation between the notches of the outer holder elements, thereby axially aligning said tubular guide and wire extending therethrough and centering said wire for engagement by said blade elements during the severing of the wire insulation during said stripping operation, whereafter a longitudinal retracting movement of said wire will strip the insulation from the lead-in portion thereof that has been threaded through said tubular guide.

2. A device as claimed in claim 1, a stop adjustably secured to one of said grip members on an inside edge thereof and including an upstanding portion that is spaced from said blade elements in alignment with said guide means and defining an abutment against which the lead-in end of said wire engages after projection through said guide means, the space between said upstanding portion and blade elements defining the portion of the insulation to be stripped from said wire, a fastening element for adjustably securing the stop in place on said one grip member, and an opening formed in the grip member adjacent to the grip member on which the stop is secured and being located in alignment with said fastening element and providing access thereto when the stop is to be adjusted relative to said blade elements.

3. A device as claimed in claim 1, the slots as formed in each of said grip members being defined by walls that form acute angles to define a wedge shaped configuration, each of said holder means having substantially a wedge shaped configuration corresponding to that of said slots, wherein said blade assemblies are frictionally and slidably received in said slots in the position of use thereof.

* * * * *